Nov. 9, 1926.
G. H. ROLFES
1,606,183
FOCUSING DEVICE
Filed Feb. 18, 1924     3 Sheets-Sheet 1
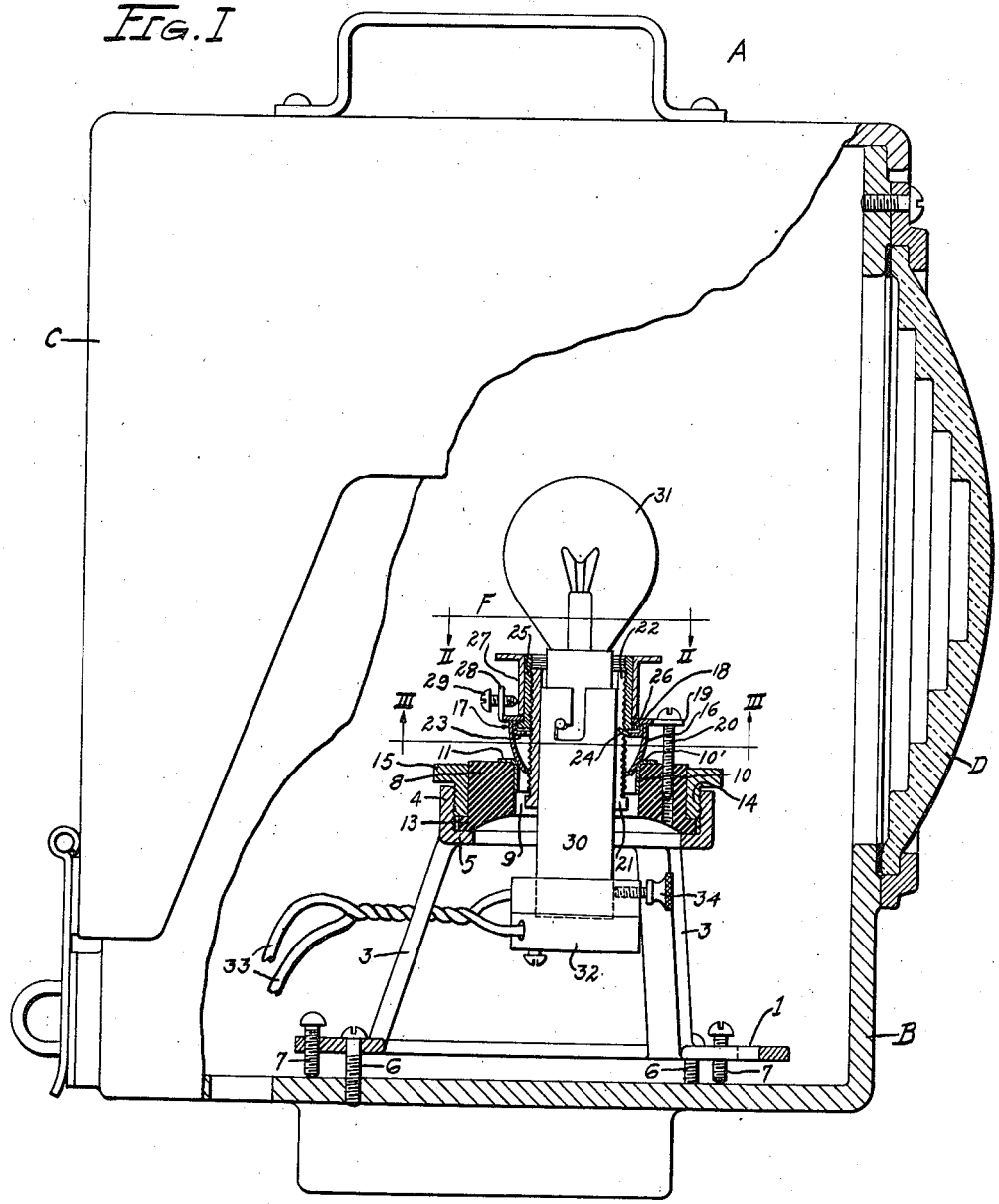
Fig. I
INVENTOR
GEORGE H. ROLFES
By Cook & McCauley
ATTORNEYS Nov. 9, 1926.
G. H. ROLFES
1,606,183
FOCUSING DEVICE
Filed Feb. 18, 1924  3 Sheets-Sheet 2
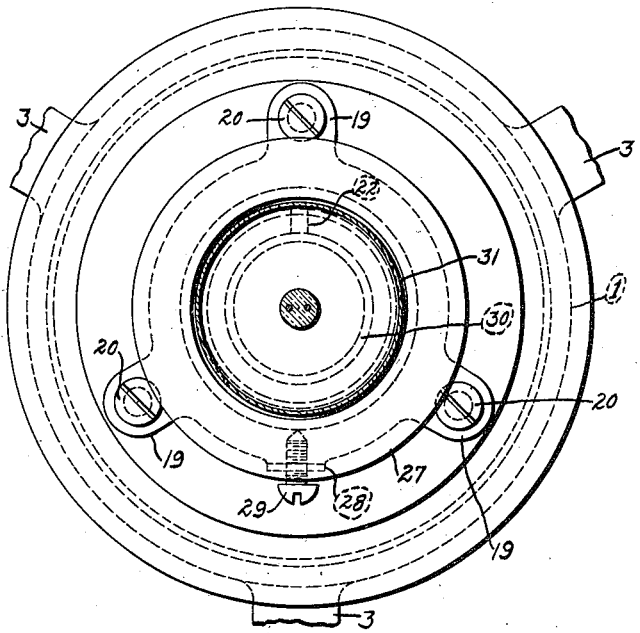
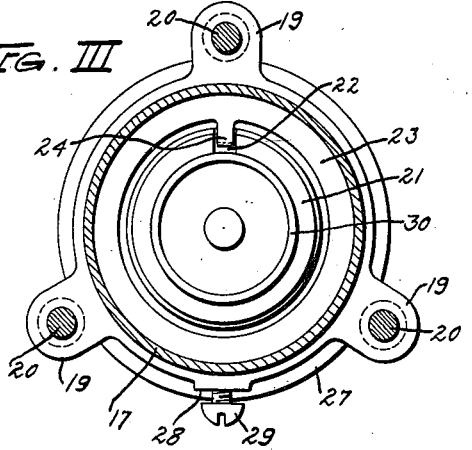
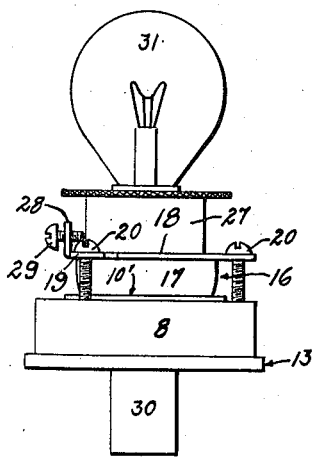
INVENTOR
GEORGE H. ROLFES
By Cook & McCauley
ATTORNEYS Nov. 9, 1926. 1,606,183
G. H. ROLFES
FOCUSING DEVICE
Filed Feb. 18, 1924   3 Sheets-Sheet 3
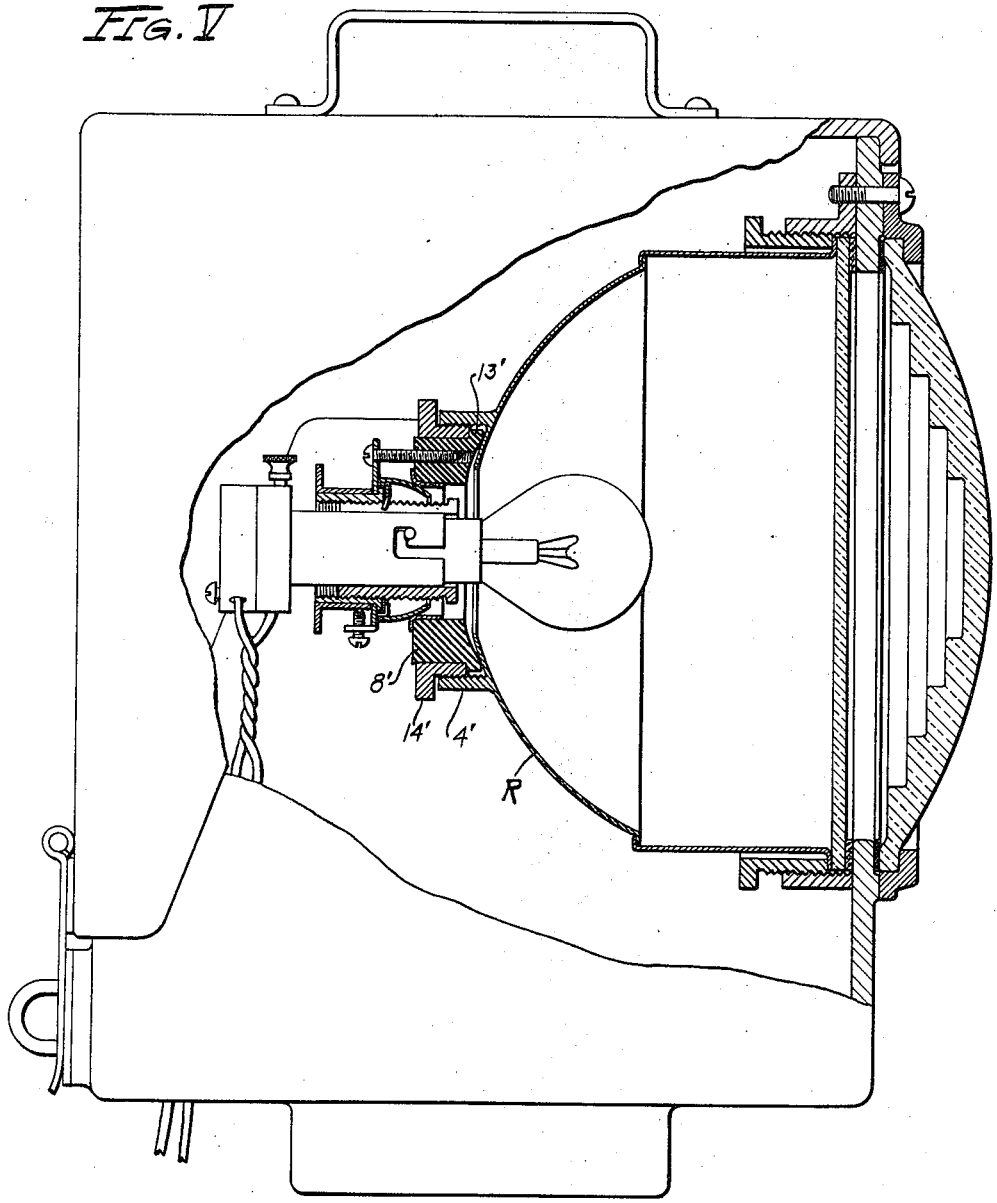
INVENTOR
GEORGE H. ROLFES
By Cook & McCauley
ATTORNEYS Patented Nov. 9, 1926.

1,606,183

UNITED STATES PATENT OFFICE.

GEORGE H. ROLFES, OF ST. LOUIS, MISSOURI, ASSIGNOR TO ALEXANDER H. HANDLON, OF ST. LOUIS, MISSOURI.

FOCUSING DEVICE.

Application filed February 18, 1924. Serial No. 693,491.

This invention relates generally to focusing devices, and particularly to a focusing device which may be associated with an electric lantern whereby the light-producing element within said electric lantern may be properly focused with respect to the lens or lenses of said lantern. While my improved focusing device may be used in any electric lantern regardless of the use to which said lantern is applied, still said focusing device is intended particularly for use in electric lanterns of the various types which are used for signaling purposes on railroads. It is very well known that the safety of the lives of the passengers riding on railroad trains and the preservation of the property of the railroad company require the use of signal lanterns which will operate with the highest possible efficiency at all times, hence the great need for a device such as the one disclosed herein.

Prior to this invention much annoyance and inconvenience was occasioned by the inability of the railroad companies to obtain electric bulbs which were accurately made, in other words, electric lamps the filaments of which were properly positioned in each of said bulbs. For an electric lantern to function in an entirely efficient manner it is necessary that the filament of the electric lamp within said lantern be in a certain position relative to the lens or lenses of the lantern. To obtain electric lamps which were as close to perfect as it was possible to secure, the railroads were required to buy only those electric lamps which were selected after a very careful inspection, and even then the lamps obtained were not always what was desired, for it is only necessary that the filaments of an electric lamp be out of position a very slight degree to render it impossible to focus that lamp in a lantern designed for use with perfectly formed electric lamps.

To remedy the inconvenience suggested above, the manufacturers of electric lamps resorted to the practice of re-basing the electric lamps intended for railroad signaling use. By this system each electric lamp was provided with a false base which was placed on the lamp. The lamp was focused at the factory, and after said lamp was properly focused the false base was permanently secured in place on said lamp, thus insuring the proper focalization of said lamp when it was placed in a standard lantern which was in use. While the re-based electric lamps were vast improvements over the ordinary lamps, still they were objectionable for the reason that the re-basing operation rendered said lamps quite expensive.

The purpose of the present invention is to produce a focusing device by means of which the ordinary run of electric lamps produced by the manufacturers may be purchased by the railroad companies. Each of these electric lamps is then associated with one or my improved focusing devices and is focused in a standard testing lantern. After the lamp has been properly focused it is removed from the testing lantern and is laid away with the focusing device attached thereto. When it is necessary to replace a lamp which is burnt out in service this focused lamp is substituted for the burnt-out lamp, and because the testing lantern in which it was focused and the lantern into which it is placed for service are both standard in every respect, said lamp will be properly focused in the last mentioned lamp. An important feature of my invention is that a great number of lamps may be focused at the convenience of the persons having charge of that work, so that there is always a supply of focused lamps on hand. When word is received that the lamp in a certain signal is out it is only necessary that the signal maintenance man take the focused lamp to the particular signal and substitute said focused lamp for the burnt-out lamp. It is apparent from this that the necessity for focusing the new lamp at the top of a pole, for instance, or perhaps under adverse weather conditions, is eliminated.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. I is a view partly in side elevation and partly in vertical section of a signal lantern showing my improved focusing device associated therewith.

Fig. II is a cross section on the line II—II of Fig. I.

Fig. III is a cross section on the line III—III of Fig. I.

Fig. IV is a side elevation showing my improved focusing device associated with an electric lamp, said view showing the parts mentioned as they will appear when ready to be introduced into the lantern.

Fig. V is a view of my improved focusing device associated with a signal lantern provided with a reflector.

In the drawings, A designates a signal lantern of a type which is in general use on railroads at the present time, said lantern comprising a body portion B, a removable portion C to permit access to the interior of said lantern, and a lens D.

Located within the lantern A is my improved focusing device F. In the lantern illustrated in Fig. I my improved focusing device is arranged in a vertical position, and said device includes a supporting element 1 which comprises a plurality of legs 3 and an upper portion 4, said legs and upper portion being secured together and constituting a complete unit. The upper portion 4 of the supporting element of my focusing device is in the form of an internally threaded collar and is provided with an annular shoulder 5. The supporting element 1 is secured to the bottom wall of the lantern A by means of a plurality of screws which are so arranged as to permit said supporting element to be adjusted to different positions relative to said bottom wall of said lantern. The adjusting screws mentioned are clearly shown in Fig. I, in which view 6 designates comparatively long screws which pass through the lower horizontal portions of the legs 3 and extend into internally threaded openings in the bottom wall of the lantern. There is one of the screws 6 in each of the legs 3, and located adjacent to each of said screws 6 is a screw 7. The screws 7 are comparatively short, said screws being extended through the lower horizontal portions of the legs 3 and the lower ends of said screws being in contact with the upper face of the bottom wall of the lantern. To adjust the supporting element 1 it is only necessary to rotate the screws 6 to cause said screws to be moved upwardly and then to manipulate the screws 7 to cause said screws to move downwardly or upwardly relative to the horizontal portions of the legs 3 whereby said legs will be permitted to move toward or caused to move away from the bottom wall of the lantern. As an illustration, assume that it is desired to cause the supporting element 1 to be moved toward the bottom wall of the lantern. In this event the screws 7 will be rotated so as to cause said screws to move upwardly relative to the horizontal portions of the legs of said supporting element. By so manipulating the screws 7 the distance between the lower faces of the legs 3 and the lowermost ends of the screws 7 will be reduced, and the supporting element would therefore be permitted to move downwardly toward the bottom wall of the lantern. After the supporting element has been properly positioned the screws 6 are rotated so as to move the heads thereof into contact with the upper faces of the legs 3, thus locking said supporting element in a fixed position as the screws 6 will prevent said supporting element from moving upwardly and the screws 7 will prevent said supporting element from moving downwardly. It is apparent from the foregoing that it is possible to move the supporting element to various positions, as it may be raised or lowered as described, or may be tilted by raising and lowering certain legs only.

8 designates an annular fiber block which is supported by the supporting element 1. The fiber block 8 extends into the collar 4 of the supporting element and rests upon the annular shoulder 5 therein. The fiber block is provided with a central opening 9, and extending into said opening is a sleeve-like member 10 provided with an annular flange 11 which overlaps the upper face of said fiber block 8. The fiber block 8 is provided with an annular flange 13 which extends outwardly from the body portion of said fiber block at the lower end thereof. 14 designates an externally threaded ring which is adapted to be screwed into the internally threaded collar 4 of the supporting device. The annular wall of the threaded ring 14 is adapted to be interposed between the inside face of the collar 4 and the outside face of the fiber block 8, and the lower edge of said ring is adapted to bear firmly against the upper face of the annular flange 13 of said fiber block. By this arrangement it is apparent that the block 8 is very firmly held in place within the collar 4 of the supporting device and it is plain that there is no danger of said block rotating relative to said collar 4 when certain other parts of the device which will be hereinafter set forth are rotated. The threaded ring 14 is provided with an outwardly extending flange 15 at its upper edge, the outer peripheral edge of said flange being knurled or otherwise roughened so as to permit the easy rotation of said ring when it is desired to screw said ring downwardly into the collar 4 or remove said ring from said collar.

16 designates a movable element which is provided with a semicircular portion 17. The semicircular portion 17 is preferably in the form of a shell of comparatively thin metal and is of such dimensions as to extend into the sleeve-like member 10 associated with the block 8. It will be seen that the member 10 is provided with a corner 10' with which the semicircular portion 17 contacts and it will be noted by referring to Fig. I that this corner is curved. By this arrangement it is plain that the semicircular portion 17 may be rocked relative to the member 10, said semicircular portion and said member 10 functioning very much like a ball and socket joint. Secured to the semicircular portion 17 of the movable element 16 is a plate 18. The plate 18 is secured by means of solder or in any other convenient manner to the semicircular portion, 17, and said plate is provided with a plurality of ears 19. Extended through each ear 19 is an adjusting screw 20. There are preferably three ears 19 and three adjusting screws 20, each of said screws passing through the associated ear and extending into internally threaded openings in the fiber block 8 (Fig. I). It is plain from the foregoing that by manipulating the screws 20, the plate 18 and semicircular portion 17 may be adjusted relative to the fiber block 8, for it is apparent that if one of the screws 20 were screwed inwardly and the associated screws 20 were moved outwardly the axis of the movable element would be shifted accordingly.

21 designates an externally screw threaded sleeve which is arranged longitudinally of the axis of the movable element 16. The externally threaded sleeve 21 is provided with a slot 22 which extends longitudinally of said sleeve, as shown in Figs. I and III. Secured to the plate 18 by means of solder or in any other suitable manner is a collar 23, said collar being L-shaped in cross section as shown in Fig. I, and being provided with a projection 24 which extends into said elongated slot 22. Arranged on the externally threaded sleeve 21 is an internally threaded sleeve 25, the threads of said sleeve 25 cooperating with the threads of said sleeve 21 as shown in Fig. I. The sleeve 25 is provided with an outwardly extending annular flange 26 at its lower end. Mounted on the sleeve 25 is an outer sleeve 27, said sleeve 27 being secured to the sleeve 25 in any convenient manner so that said sleeve 25 and said sleeve 27 will rotate as a unit. It will be observed by referring to Fig. I that the lower end of the outer sleeve 27 is spaced apart from the upper face of the annular flange 26 and that the inner edge portion of the annular plate 18 extends into the space between said parts. It is apparent that the outer sleeve 27 and the threaded sleeve 25 may rotate relative to the plate 18, but it is also plain that said sleeves may not move longitudinally of the axis of the movable element 16. 28 designates an ear formed on the plate 18, said ear being provided with an internally threaded opening, and 29 indicates a locking screw which passes through said threaded opening in said ear. The screw 29 is adapted to be adjusted so that an end thereof will bear against the outer sleeve 27, by which arrangement said sleeve may be prevented from being accidentally rotated. Located within the externally threaded sleeve 21 is an electric lamp socket 30 of a common type, said socket being fixed to said externally threaded sleeve and being adapted to move therewith. Arranged at the upper end of the socket 30 is an electric lamp 31 and fixed to the lower end of said socket is a connecting device 32 by means of which electric conductors 33 are connected to said sockets in a manner to supply electric current to the electric lamp 31.

The operation of my device is as follows:
Assume that the lantern shown in Fig. I is a testing lantern in which electric lamps are focused for service in regular signal lanterns. Assume also that within the lantern illustrated in Fig. I only the supporting element 1 is present; in other words, that the threaded ring 14 and all other parts held in place thereby are missing. The fiber block 8, movable portion 16, sleeves 21, 25 and 27, socket 30, and various small parts associated with the parts mentioned, are held together and constitute a single unit as shown in Fig. IV, which for the sake of convenience will be termed the focusing unit. If it be assumed now that it is desired to focus an electric lamp the person doing the work would introduce said electric lamp into the proper end of the socket 30 of the focusing unit, at which time said focusing unit would appear as shown in Fig. IV. The focusing unit is then located in place on the supporting element 1 in the testing lantern with the annular flange 13 of the fiber block 8 resting upon the shoulder 5 of said supporting element. The threaded ring 14 is then caused to surround the upper portion of the focusing unit and is brought downwardly to a position where the threads thereon engage the threads within the collar 4. The threaded ring 14 is then rotated so as to cause the flange 13 on the fiber block 8 to be gripped between the lower edge of said ring 14 and the shoulder 5. It is apparent from the foregoing that the entire focusing unit is very securely attached to the supporting element 1. After the focusing unit is secured in place as described, the connecting device 32 is secured to the lower end of the socket 30 by means of the screw 34 and the focusing of the lamp may be proceeded with.

It may be that the filament of the electric lamp which is being focused is quite a substantial distance out of position, and to bring said filament to a position where it is reasonably close to its proper position the screws 6 and 7 are manipulated. The manipulation of the screws 6 and 7 adjusts the position of the supporting element 1, and said screws are only utilized to obtain the preliminary adjustment of the lamp, the finer adjustment being obtained in a manner to be hereinafter pointed out. After the preliminary adjustment of the lamp by means of the screws 6 and 7, the screws 20 are manipulated, and as the different screws 20 are moved upwardly or downwardly the movable portion 16 will be moved relative to the fiber block 8 and the filament of the lamp will consequently be shifted relative to the lens of the lantern. It may be that the filament of the lamp is in a higher or lower plane than the center of the lens, and when this is so the outer sleeve 27 is rotated to shift said lamp in a vertical direction. The outer sleeve 27 is secured to the internally threaded sleeve 25 and the threads of said internally threaded sleeve cooperate with the threads of the externally threaded sleeve 21. It will be remembered that the projection 24 extends into the elongated slot 22 in the sleeve 21, consequently said sleeve is not permitted to rotate. It is therefore plain that when the outer sleeve 27 and the internally threaded sleeve 25 are rotated, the externally threaded sleeve 21 will be caused to move upwardly or downwardly according to the direction of rotation of said outer sleeve and said internally threaded sleeve, and because the socket 30 is secured to said externally threaded sleeve 21 it is apparent that the electric lamp 31 will also be moved vertically. It is plain, therefore, that the device disclosed in the present application provides means whereby an electric lamp may be moved universally with respect to the lens of the lantern in which said lamp is located.

After a lamp has been focused as described, the threaded ring 14 is unscrewed and the connecting device 32 is removed from the lower end of the socket 30. The entire focusing unit with the lamp associated therewith is then removed from the testing lantern, and said lamp and focusing unit is ready for use in a lantern in service. If it will be assumed now that word was received that the lamp in a certain signal lantern was out, in this event the person having charge of that work would take one of the focusing units with a focused lamp associated therewith to the signal lantern in question. The threaded ring 14 associated with the focusing unit within said signal lantern would be removed and said focusing unit within said lantern would be taken therefrom. The new focusing unit would then be arranged in place and the threaded ring 14 would be screwed downwardly against the flange 13 of the fiber block 8. After this had been done the connecting device 32 would be attached to the lower end of the socket 30, at which time the lantern would again be in working condition with a properly focused lamp therein due to the fact that the testing lantern in which the lamp was focused and the lantern into which said lamp was placed for service are standard in every respect and because the adjustment of the supporting elements in the testing lantern and in the service lanterns is the same.

Fig. V illustrates my focusing device associated with a lantern having a reflector R. The reflector in Fig. V is arranged in place in the lantern in the usual manner and said reflector is provided with an internally threaded socket 4'. The fiber block 8' is provided with a flange 13' which bears against the rearmost face of said reflector R. 14' designates a threaded ring which screws into the internally threaded socket 4' and bears against the flange 13' on the fiber block 8', whereby said flange 13' is gripped between the inner end of said threaded ring and the rearmost face of said reflector. All of the parts of the device shown in Fig. V other than those mentioned are the same as the corresponding parts of the device illustrated in Fig. I, and because the operations of both devices are identical except that the device shown in Fig. V has no preliminary adjusting devices such as the screws 6 and 7, said devices shown in Fig. V will not be described further.

I claim:

1. A device for focusing a light source in an electric lantern, comprising a stationary element, a movable element, a light-producing element supported by said movable element, said movable element being provided with a semicircular portion and said stationary element including a socket into which said semicircular portion of said movable element extends, and adjusting means whereby said semicircular portion of said movable element may be rocked relative to the stationary member into which it extends to properly position said light-producing element relative to the lens of said electric lantern, said stationary element and said movable element being provided with means to be capable of being secured together whereby said elements, together with said light-producing element, may be removed from the lantern as a unit without disturbing the adjustment of said light-producing element.

2. A device for focusing a light source in an electric lantern, comprising a stationary element, a movable element, a light-producing element supported by said movable element, said movable element being movable to adjust the position of said light-producing element in directions which are angular relative to the axis of said stationary element, and means whereby said light-producing element may be adjusted axially of said stationary element, the last mentioned means comprising a threaded sleeve, threaded means cooperating with said threaded sleeve whereby said threaded sleeve may be moved longitudinally, and means whereby said threaded means may be locked in fixed positions, said stationary element and said movable element being provided with means to be capable of being secured together whereby said elements, together with said light-producing element, may be removed from the lantern as a unit without disturbing the adjustment of said light-producing element.

3. A device for focusing a light source in an electric lantern, comprising a stationary element, a movable element, a light-producing element supported by said movable element, said movable element being capable of adjustment so as to move said light-producing element in directions which are angular to the axis of said stationary element and means whereby said light-producing element may be adjusted axially of said stationary element, the last mentioned means comprising a threaded sleeve, threaded means cooperating with said threaded sleeve and arranged to rotate relative thereto, and means for preventing the rotation of said threaded sleeve, said stationary element and said movable element being provided with means to be capable of being secured together whereby said elements, together with said light-producing element, may be removed from the lantern as a unit without disturbing the adjustment of said light-producing element.

4. A device for focusing a light source in an electric lantern, comprising a stationary element, a movable element, a light-producing element supported by said movable element, said movable element being capable of adjustment so as to move said light-producing element in directions which are angular to the axis of said stationary element, and means whereby said light-producing element may be adjusted axially of said stationary element, the last mentioned means comprising a threaded sleeve, threaded means cooperating with said threaded sleeve and arranged to rotate relative thereto, said threaded sleeve being provided with an elongated opening, and means extending into said elongated opening in said threaded sleeve whereby the rotation of said threaded sleeve is prevented, said stationary element and said movable element being provided with means to be capable of being secured together whereby said elements, together with said light-producing element, may be removed from the lantern as a unit without disturbing the adjustment of said light-producing element.

5. A device for focusing a light source in an electric lantern, comprising a supporting element, a stationary element supported by said supporting element, a movable element, a light-producing element supported by said movable element, said movable element being capable of adjustment so as to move said light-producing element in directions which are angular to the axis of said supporting element, means whereby said light-producing element may be adjusted axially of said supporting element, said means comprising a threaded sleeve, threaded means cooperating with said threaded sleeve and arranged to rotate relative thereto, said threaded sleeve being provided with an elongated opening and means extending into said elongated opening whereby the rotation of said threaded sleeve is prevented, said stationary element and said movable element being provided with means to be capable of being secured together whereby said elements, together with said light-producing element, may be removed from the lantern as a unit without disturbing the adjustment of said light-producing element, and means comprising threaded adjusting devices cooperating with the bottom wall of said electric lantern whereby said supporting element may be adjusted.

6. A device for focusing a light source in an electric lantern, comprising a supporting element, a movable element, a light-producing element supported by said movable element, said movable element being provided with a semicircular portion and said stationary element including a socket into which said semicircular portion of said movable element extends, adjusting screws associated with said movable element whereby said semicircular portion of said movable element may be rocked within said socket member so as to move said light-producing element in directions which are angular to the axis of said supporting element, means whereby said light-producing element may be moved axially of said supporting element, the last mentioned means comprising a threaded sleeve, threaded means cooperating with said threaded sleeve and arranged to rotate relative thereto, said threaded sleeve being provided with an elongated opening, means extending into said elongated opening whereby the rotation of said threaded sleeve is prevented, and means comprising threaded adjusting devices cooperating with the bottom wall of said electric lantern whereby said supporting element may be adjusted.

In testimony that I claim the foregoing I hereunto affix my signature.

. GEORGE H. ROLFES.